Patented Aug. 17, 1937

2,090,438

UNITED STATES PATENT OFFICE 2,090,438

HYDROXYBENZOFLUORENONES AND PROCESS OF MAKING SAME

Gérald Bonhôte, Basel, Switzerland, assignor to Society of Chemical Industry in Basle, Basel, Switzerland No Drawing. Application November 21, 1936, Serial No. 112,141. In Switzerland November 26, 1935

4 Claims. (Cl. 260—131)

It has been found that new hydroxybenzofluorenones may be obtained by treating with acid condensing agents ortho-hydroxydiarylketones, obtainable themselves by condensing the halides of the 2,3-hydroxynaphthalene carboxylic acids with aromatic compounds.

The new hydroxybenzofluorenones of the general formula

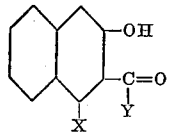

in which X and Y represent two adjacent carbon atoms of an aromatic ring of the benzene series, are red powders dissolving in caustic alkalies, preferably in the presence of assistants, such as Turkey red oil, to red-violet solutions. They react with diazo compounds with formation of azodyestuffs. Their alkali salts are further characterized by an excellent affinity for the cellulose fiber. They are therefore suitable for producing fast tints according to the methods used in the production of ice colors. Thus, for example the 1-hydroxy-3,4-benzofluorenone, combined on the vegetable fiber with diazotized 4,4'-dichloroaminodiphenylether, produces a Bordeaux tint; with diazotized 4-amino-3-methoxyazo-benzene or 4-amino-3-methoxy-6-methyl-4'-chloroazobenzene extraordinarily fast black tints are obtained.

The following examples illustrate the invention, the parts being by weight:—

Example 1

25 parts of 2-hydroxynaphthalene-3-phenyl-ketone are stirred for 2 hours at 120–130° C. with 75 parts of aluminium chloride and then for 1 hour at 140–150° C. The viscous melt becomes solid on cooling. It is pulverized and gradually introduced into dilute hydrochloric acid while stirring, whereupon stirring is continued for some time. The condensation product is filtered, dissolved in hot dilute caustic soda solution, and filtered from any impurities which may be present. The clear solution is acidified with hydrochloric acid of 10 per cent. strength, whereby the new condensation product precipitates. When recrystallized from alcohol its melts at 163° C. The new product corresponds to the formula

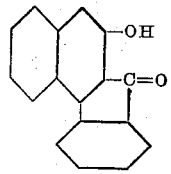

Example 2

25 parts of 2-hydroxynaphthalene-3-(4'-methyl)-phenyl-ketone are stirred for 2 hours at 120–130° C. with 75 parts of aluminium chloride and then for 1 hour at 140–150° C. The viscous melt becomes solid on cooling. It is pulverized and gradually introduced into dilute hydrochloric acid while stirring, whereupon stirring is continued for some time. The condensation product is filtered, dissolved in hot dilute caustic soda solution, and filtered from any impurities which may be present. The clear solution is acidified with hydrochloric acid of 10 per cent. strength, whereby the new condensation product precipitates. When recrystallized from alcohol its melts at 178° C. The new product corresponds to the formula

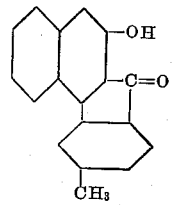

What I claim is:—

1. Process for the manufacture of hydroxybenzofluorenones, consisting in treating with acid condensing agents ortho-hydroxy-diarylketones obtainable from halides of the 2,3-hydroxynaphthalene carboxylic acids and aromatic bezene hydrocarbons.

2. The hydroxybenzofluorenones of the formula

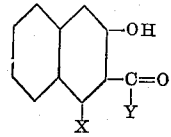

in which X and Y represent two adjacent carbon atoms of an aromatic ring of the bezene hydrocarbon series, which products are red powders dissolving in dilute caustic alkalies on addition of assistants to red-violet solutions.
3. The hydroxybenzofluorenone of the formula
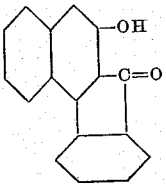
4. The hydroxybenzofluorenone of the formula
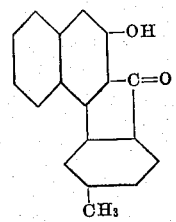
GÉRALD BONHÔTE.